United States Patent [19]

Ohtsubo

[11] Patent Number: 5,240,986
[45] Date of Patent: * Aug. 31, 1993

[54] POLYCARBONATE RESIN COMPOSITION

[75] Inventor: Kazunari Ohtsubo, Ichihara, Japan

[73] Assignee: Idemitsu Petrochemical Co., Ltd., Tokyo, Japan

[*] Notice: The portion of the term of this patent subsequent to Oct. 8, 2008 has been disclaimed.

[21] Appl. No.: 572,120

[22] Filed: Aug. 23, 1990

Related U.S. Application Data

[62] Division of Ser. No. 321,956, Mar. 9, 1989, Pat. No. 5,055,508.

[30] Foreign Application Priority Data

Mar. 31, 1988 [JP] Japan ................... 63-75988
Mar. 31, 1988 [JP] Japan ................... 63-75989

[51] Int. Cl.$^5$ ........................................... C08K 5/05
[52] U.S. Cl. ........................... 524/385; 524/151; 524/153; 524/414; 524/487; 524/611
[58] Field of Search ............... 524/385, 611, 151, 153, 524/414, 487

[56] References Cited

U.S. PATENT DOCUMENTS

| | | | |
|---|---|---|---|
| 3,622,538 | 11/1971 | Green | 524/153 |
| 3,784,595 | 1/1974 | Schirmer et al. | 524/318 |
| 3,836,499 | 9/1974 | Schirmer et al. | 260/31.2 |
| 4,088,709 | 5/1978 | Seymour et al. | 524/120 |
| 4,097,547 | 6/1978 | Cleveland et al. | 524/424 |
| 4,131,575 | 12/1978 | Adelmann et al. | 524/611 |
| 4,143,024 | 3/1979 | Ademann et al. | 524/611 |
| 4,145,696 | 11/1979 | Mark | 524/490 |
| 4,178,281 | 11/1979 | Horn, Jr. | 524/120 |
| 4,248,976 | 2/1981 | Clubley et al. | 524/132 |
| 4,248,976 | 2/1981 | Chubley et al. | 524/132 |
| 4,308,196 | 12/1981 | Limbert | 524/117 |
| 4,456,725 | 6/1984 | Liu et al. | 524/487 |
| 4,521,562 | 6/1985 | Rosenquist | 524/490 |
| 4,678,845 | 7/1987 | Takamatsu | 524/811 |
| 4,743,641 | 5/1988 | Shizawa | 524/611 |
| 4,762,873 | 8/1988 | Miyauchi et al. | 524/128 |

FOREIGN PATENT DOCUMENTS

| | | |
|---|---|---|
| 0205192 | 12/1986 | European Pat. Off. . |
| 1174979 | 7/1964 | Fed. Rep. of Germany . |
| 2220185 | 11/1973 | Fed. Rep. of Germany . |
| 44552 | 2/1976 | Japan . |
| 84352 | 6/1980 | Japan . |
| 81245 | 11/1985 | Japan . |
| 8601409 | 1/1988 | Netherlands . |

OTHER PUBLICATIONS

Patent Abstracts of Japan, "Aromatic Polyester-Polycarbonate Resin Composition", Jun. 1980, p. 158, vol. 4 No. 129, JP 55-84353.

Chemical Abstracts, vol. 90, No. 26, Jun. 1979, p. 62, 90:205366d.

Primary Examiner—Paul R. Michl
Assistant Examiner—Edward J. Cain
Attorney, Agent, or Firm—Frishauf, Holtz, Goodman & Woodward

[57] ABSTRACT

The present invention relates to a polycarbonate resin composition comprising:
100 parts by weight of a polycarbonate resin;
(A) 0.05 to 1 part by weight of long chain aliphatic alcohol represented by the general formula: $C_nH_{2n+1}OH$ wherein n is 25 or more; and
(B) 0 to 0.001 part by weight as phosphorus atom of at least one phosphorus compound selected from the group consisting of phosphorous acid and phosphorous acid esters The composition of the present invention is excellent in heat resistance and hydrolytic resistance, and further has good mold releasing properties. Thus the composition of the present invention can be used in production of electric and electronic devices, office automation machines, and structural parts by application of various molding methods 14 Claims, No Drawings

POLYCARBONATE RESIN COMPOSITION

This application is a division and a Continuation-In-Part of application Ser. No. 07/321,956 filed March 9, 1989 now U.S. Pat. No. 5,055,058, issued Oct. 8, 1991.

FIELD OF THE INVENTION

The present invention relates to a polycarbonate resin composition and more particularly to a polycarbonate resin composition which is excellent in mold releasing properties and further is good in heat resistance and hydrolytic resistance.

BACKGROUND OF THE INVENTION

Polycarbonate is widely used in various fields because of its excellent transparency, mechanical characteristics and dimentional stability.

In order to improve antistatic properties of polycarbonate, it is proposed to add fatty acid monoglyceride to the polycarbonate (Japanese Patent Publication No. 4141/1980)

This antistatic polycarbonate composition, however, is not satisfactory in thermal stability. Thus, a polycarbonate resin composition containing phosphorus compounds, e.g., phosphorous acid and phosphorous acid ester, which is thermally stable, is proposed (Japanese Patent Publication No. 44552/1976).

If, however, the phosphorus compound is added in an amount of more than 0.001% by weight (10 ppm) calculated as a phosphorus atom, hydrolytic resistance is seriously deteriorated.

SUMMARY OF THE INVENTION

The present invention is intended to overcome the above prior art problems, and an object of the present invention is to provide a polycarbonate resin composition which is excellent in heat resistance and hydrolytic resistance, and further in mold releasing properties.

The present invention relates to a polycarbonate resin composition comprising:
100 parts by weight of a polycarbonate resin;
(A) 0.05 to 1 part by weight of long chain aliphatic alcohol represented by the general formula: $C_nH_{2n+1}OH$ wherein n is 25 or more; and
(B) 0 to 0.001 part by weight as a phosphorus atom of at least one phosphorus compound selected from the group consisting of phosphorous acid and phosphorous acid esters.

DETAILED DESCRIPTION OF THE INVENTION

The polycarbonate resin to be used as a base of the composition of the present invention is represented by the following general formula:

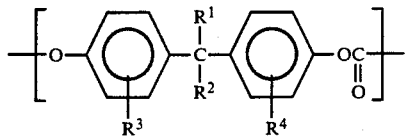

wherein $R^1$, $R^2$, $R^3$ and $R^4$ are independently a substituent, e.g. a hydrogen atom, a hydrocarbon group or a halogen atom.

The polycarbonate resin can be prepared by the solvent method in which divalent phenol and a carbonate precursor, e.g. phosgene are reacted in a solvent, e.g. methylene chloride in the presence of a known acid receptor and a known molecular weight modifier, or the ester exchange method in which divalent phenol and a carbonate precursor, e.g. carbonic acid diester (diphenyl carbonate) are subjected to an ester exchange reaction As the divalent phenol, bisphenols are preferably used. Of these, 4,4'-dihydroxyphenylpropane (bisphenol A) is particularly preferred. Those resulting from partial or full substitution of bisphenol A with other divalent phenol can be used. Divalent phenols other than bisphenol A include compounds such as hydroquinone, 4,4'-dihydroxydiphenyl, bis(4-hydroxyphenyl)alkane, bis(4-hydroxyphenyl)cycloalkane, bis(4-hydroxyphenyl)sulfide, bis(4-hydroxyphenyl)sulfone, bis(4-hydroxyphenyl) sulfoxide or bis(4-hydroxyphenyl) ether, and halogenated bisphenols such as bis(3,5-dibromo-4-hydroxyphenyl)propane or bis(3,5-dichloro-4-hydroxyphenyl)propane. These divalent phenols may be in the form of homopolymers, or copolymers comprising two or more thereof, or blends thereof In addition, the polycarbonate resin may be a thermoplastic random branched polycarbonate obtained by reacting a polyfunctional aromatic compound with divalent phenol and/or a carbonate precursor.

The viscosity average molecular weight of the polycarbonate resin to be used in the present invention is preferably 10,000 to 100,000 and particularly preferably 14,000 to 35,000 from the viewpoint of mechanical strength and moldability.

In the invention, as the component (A), long chain aliphatic alcohol is used.

The long chain aliphatic alcohol is represented by the general formula, $C_nH_{2n+1}OH$ wherein n is 25 or more. For example, hexacosanol-1, octacosanol-1, nacosanol, melissyl alcohol and the like are preferably used.

The amount of the component (A) compounded is 0.05 to 1 part by weight, preferably 0.07 to 0.8 part by weight per 100 parts by weight of the polycarbonate resin. If the amount of the component (A) compounded is less than 0.05 part by weight, a mold releasing pressure is undesirably high and in some cases, noise is generated at the time of releasing. On the other hand, if it is more than 1 part by weight, the additives bleed out, making the resin turbid, or decreasing its heat resistance.

In the invention, as the component (B), at least one phosphorus compound selected from the group consisting of phosphorous acid and phosphorous acid esters is used.

Phosphorous acid esters which can be used are those commonly used as thermal stabilizers or antioxidants. It may be monophosphites or diphosphites. Examples of monophosphite are tris(2,4-di-tertbutylphenyl) phosphite and tris(mono or di-nonylphenyl) phosphite. As diphosphite, those represented by the general formula

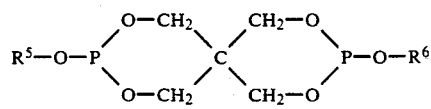

wherein $R^5$ and $R^6$ may be the same or different and are independently an alkyl group having 1 to 20 carbon atoms, a cycloalkyl group having 3 to 20 carbon atoms, or an aryl group having 6 to 20 carbon atoms, are used.

Specific examples are distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl-4-methylphenyl)pentaerythritol diphosphite, dicyclohexylpentaerythritol diphosphite, and tetrakis(2,4-di-tert-butylphenyl)-4,4'-biphenylene phosphite.

Of these, aromatic phosphorous acid esters such as trisnonylphenyl phosphite and trisphenyl phosphite are preferred.

The component (B) is used in a proportion of 0 to 0.001 part by weight, preferably 0 to 0.0008 part by weight as a phosphorus atom per 100 parts by weight of the polycarbonate resin. Although addition of the component (B) in the specified amount increases heat resistance and hydrolytic resistance, if it is added in an amount of more than 0.001 part by weight (10 ppm), hydrolytic resistance is seriously reduced In this sense, it is preferred for the component (B) to be used in as small an amount as possible. In the invention, by using the above component (A), the amount of the component (B) used can be decreased to the smallest possible amount.

In the present invention, paraffin wax is used as the component (C), if necessary.

This paraffin wax preferably has a softening point of 75° to 90° C. and particularly preferably a softening point of 80° to 90° C. The average number of carbon atoms of the paraffin wax is preferably 37 to 40 and particularly preferably 38 to 40

Although such a paraffin wax belongs to petroleum wax, its softening point is different from those of microcrystalline wax, petrolatum and so on.

The paraffin wax is preferably in a solid or powder form In this case, the particle diameter is preferably about 1 mm. Of course, it is possible that solid paraffin wax is melted by heating to more than its softening point and added If the softening point of the paraffin wax is less than 75° C., heat resistance is reduced and Δ YI in evaluation of heat resistance is undesirably increased. On the other hand, if it is more than 90° C., a mold releasing pressure is undesirably increased, compatibility with polycarbonate is reduced, and transparency is slightly decreased.

These paraffin waxes can be used as mixtures comprising two or more thereof.

When paraffin wax is used as the component (C), it is used in an amount of 0.05 to 1 part by weight, preferably 0.1 to 0.6 part by weight per 100 parts by weight of the polycarbonate resin. If the amount of the component (C) added is less than 0.05 part by weight, a mold releasing pressure is undesirably increased and in some cases, noise is generated at the time of releasing. On the other hand, if it is more than 1 part by weight, the additives bleed out, making the resin turbid.

When the component (C) is used, it is necessary that the total amount of the components (A) and (C) is 0.1 to 1 part by weight, with the range of 0.3 to 0.8 part by weight being preferred If the total amount of the components (A) and (C) is less than 0.1 part by weight, a mold releasing pressure is undesirably high and in some cases, noise is generated at the time of releasing from the mold. On the other hand, if the total amount of the components (A) and (C) is more than 1 part by weight, the resulting composition is turbid and its product value is seriously decreased.

In the invention, as described above, the aforementioned components (A), (B) and if necessary, the component (C) are added to the polycarbonate resin in the specified proportions.

In the present invention, as well as the above components, various additives can be added, if necessary, as long as they do not deteriorate the effects of the present invention. For example, glass fiber, carbon fiber, metal fiber, an inorganic filler, metal powder, an ultraviolet absorber, a flame retardant, a colorant and the like can be added.

The polycarbonate resin composition of the present invention can be obtained by compounding the above components and then kneading. Compounding and kneading can be carried out by the usual method, for example, by the use of a ribbon blender, a Henschel mixer, a Bambury's mixer, a drum tumbler, a mono-screw extruder, a twin-screw extruder, a cokneader, a multi-screw extruder and so on. In this kneading, a heating temperature is usually 250° to 300° C.

The polycarbonate resin composition of the present invention as described above is excellent in heat resistance and hydrolytic resistance, and further has good mold releasing properties. Thus the polycarbonate resin composition of the present invention can be used in production of electric and electronic devices, office automation machines, and structural parts, e.g. car parts by application of various molding methods, e.g. injection molding, extrusion molding, compression molding, calender molding, or rotary molding, and particularly is effective in production of products which are large sized, are small in thickness, and are required to have good mold releasing properties, by injection molding.

The present invention is described in greater detail with reference to the following examples.

Examples 1 to 5, and Comparative Examples 1 to 4

Components (A), (B) and (C) were compounded to a polycarbonate resin in the formation shown in Table 1, preliminarily kneaded in a drum tumbler, and then kneaded at 270° C. in an extruder to obtain a polycarbonate resin composition. This composition was tested by the following methods The results are shown in Table 1.

Testing Method (1) Heat Resistance (Δ YI)

Molding was continuously carried out under conditions of a cylinder temperature of 290° C., a mold temperature of 90° C., an injection time of 20 seconds, a cooling time of 20 seconds, a back pressure of 5 $kg/cm^2G$ and a number of screw rotations of 46 rpm by the use of a 15 ounce injection molding machine and a mold with a runner (diameter: 6 mm; length 80 mm) and capable of forming a molding piece having a size (80 mm × 80 mm × 3 mm (thickness)). The molding at the first shot and the molding at the 60th shot were measured for an yellow index (YI) according to JIS K-7103, and the difference therebetween (Δ YI) was indicated As Δ YI decreases, the heat resist improves.

(2) Mold Releasing Pressure ($kg/cm^2$)

A pressure produced in an ejector was measured by the use of a coaxial cylinder having a length of 35 mm, a diameter of 40 to 42 mm, and a wall thickness of 2 mm.

(3) Metal Rust

Measured with the naked eye.

(4) Long Term Heat Resistance (Δ YI)

A test piece for measuring a degree of yellow was molded under the standard molding conditions described in (1) above. This test piece was allowed to stand for 14 days in an oven maintained at 140° C., and then an yellow index was measured. The difference (Δ YI) was indicated.

(5) Hydrolytic Resistance

A test piece for measuring a degree of yellow was molded under the standard molding conditions described in (1) above. This test piece was exposed to a saturated steam atmosphere maintained at 120° C. for 48 hours, and then a change in appearance and a viscosity average molecular weight were measured. A drop in molecular weight (Δ Mv) was indicated.

TABLE 1

| | PC*[1] (parts by weight) | (A) Long Chain Aliphatic Alcohol (parts by weight) | | (B) Phosphorus Compound*[3] (parts by weight) | (C) Paraffin Wax*[4] (parts by weight) | Heat Resistance (Δ YI) | Mold Releasing Pressure (kg/cm$^2$) | Mold Rust |
|---|---|---|---|---|---|---|---|---|
| Example | | | | | | | | |
| 1 | 100 | Long chain aliphatic alcohol*[2] | 0.07 | 0 | — | 4.5 | 25 | No rust |
| 2 | 100 | Long chain aliphatic alcohol*[2] | 0.5 | 0.0003 | — | 4.5 | 24 | No rust |
| 3 | 100 | Long chain aliphatic alcohol*[2] | 0.7 | 0.0008 | — | 4.5 | 24 | No rust |
| 4 | 100 | Long chain aliphatic alcohol*[2] | 0.5 | 0.0008 | Ⓐ ... 0.3 | 4.2 | 24 | No rust |
| 5 | 100 | Long chain aliphatic alcohol*[2] | 0.3 | 0.0008 | Ⓑ ... 0.1 | 4.5 | 26 | No rust |
| Comparative Example | | | | | | | | |
| 1 | 100 | Stearyl alcohol (C$_{18}$) | 0.07 | 0 | — | 9.3 | 27 | No rust |
| 2 | 100 | Stearyl alcohol (C$_{18}$) | 0.5 | 0.0003 | — | 7.6 | 26 | No rust |
| 3 | 100 | Behenyl alcohol (C$_{22}$) | 0.07 | 0 | — | 8.6 | 26 | No rust |
| 4 | 100 | Behenyl alcohol (C$_{22}$) | 0.5 | 0.0003 | — | 6.9 | 26 | No rust |

| | Long Term Heat Resistance (Δ YI) | Hydrolytic Resistance | |
|---|---|---|---|
| | | Change in Molecular Weight (Δ Mv) | Appearance |
| Example | | | |
| 1 | 4.2 | 100 | Good |
| 2 | 4.3 | 400 | Good |
| 3 | 4.2 | 300 | Good |
| 4 | 4.3 | 400 | Good |
| 5 | 4.3 | 400 | Good |
| Comparative Example | | | |
| 1 | 4.5 | 400 | Good |
| 2 | 4.2 | 500 | Good |
| 3 | 4.3 | 400 | Good |
| 4 | 4.1 | 400 | Good |

*[1]PC: Bisphenol A polycarbonate. TOUGHLON FN2200 produced by Idemitsu Petrochemical Co., Ltd.; viscosity average molecular weight: 22,100
*[2]Long chain aliphatic alcohol: C$_{26}$H$_{53}$OH. UNISAFE UNA produced by Nippon Yushi Co., Ltd.
*[3]Phosphorus compound: Trisnonylphenyl phosphite. SUMILIZER TNP produced by Sumitomo Chemical Co., Ltd.
*[4]Paraffin Wax
Paraffin wax Ⓐ. "HNP-16" produced by Nippon Seiro Co., Ltd.; average number of carbon atoms: 39.5; softening point: 89.0° C.
Paraffin wax Ⓑ "HNP-9" produced by Nippon Seiro Co., Ltd.; average number of carbon atoms: 37.1; softening point: 75.1° C.
Paraffin wax Ⓒ A blend of paraffin wax Ⓐ/paraffin wax Ⓑ = 50/50 softening point 82° C.

What is claimed is:

1. A polycarbonate resin composition consisting of 100 parts by weight of a polycarbonate resin;
   (A) 0.05 to 1 part by weight of a long chain aliphatic alcohol of the formula $C_nH_{2n+1}OH$, wherein n is at least 25; and
   (B) at least one phosphorus compound selected from the group consisting of phosphorous acid and a phosphorous acid ester, said phosphorus compound contained in an amount of no greater than 0.001 part by weight as a phosphorus atom to 100 parts by weight of the polycarbonate resin.

2. A polycarbonate resin composition consisting of 100 parts by weight of a polycarbonate resin;
   (A) 0.05 to 1 part by weight of a long chain aliphatic alcohol of the formula $C_nH_{2n+1}OH$, wherein n is at least 25;
   (B) at least one phosphorus compound selected from the group consisting of phosphorous acid and a phosphorous acid ester, said phosphorus compound contained in an amount of no greater than 0.01 part by weight as a phosphorus atom to 100 parts by weight of the polycarbonate resin; and
   (C) 0.05 to 1 part by weight of a parafin wax to 100 parts by weight of the polycarbonate resin.

3. The composition as claimed in claim 1, wherein the polycarbonate resin has a viscosity average molecular weight of 10,000 to 100,000.

4. The composition as claimed in claim 1, wherein the amount of the component (A) is 0.07 to 0.8 part by weight per 100 parts by weight of the polycarbonate resin.

5. The composition as claimed in claim 1, wherein the phosphorus compound is a phosphorous acid ester selected from the group consisting of trisnonylphenyl phosphite and trisphenyl phosphite.

6. The composition as claimed in claim 1, wherein the amount of the component (B) is 0 to 0.0008 part by weight as a phosphorus atom per 100 parts by weight of the polycarbonate resin.

7. The composition as claimed in claim 1, wherein the phosphorus compound is a phosphorous acid ester selected from the group consisting of monophosphites and diphosphites.

8. The composition as claimed in claim 7, wherein the phosphorous acid ester is a monophosphite selected from the group consisting of tris(2,4-di-tertbutylphenyl)phosphite, tris(monononylphenyl)phosphite and tris(di-nonylphenyl)phosphite.

9. The composition as claimed in claim 7, wherein the phosphorous acid ester is a diphosphite of the formula

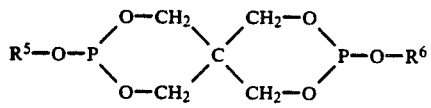

wherein $R^5$ and $R^6$ are the same or different and are independently an alkyl group having 1 to 20 carbon atoms, a cycloalkyl group having 3 to 20 carbon atoms or an aryl group having 6 to 20 carbon atoms.

10. The composition as claimed in claim 7, wherein the phosphorous acid ester is a diphosphite selected from the group consisting of distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl-4-methylphenyl)pentaerythritol diphosphite, dicyclohexylpentaerythritol diphosphite and tetrakis(2,4-di-tert-butylphenyl)-4,4'-biphenylene phosphite.

11. The composition as claimed in claim 1, wherein the polycarbonate is bisphenol A polycarbonate; the long chain aliphatic alcohol is $C_{26}H_{53}OH$; and the phosphorus compound is trisnonylphenyl phosphite.

12. The polycarbonate resin composition as claimed in claim 1, wherein the polycarbonate resin has a viscosity average molecular weight of 14,000 to 35,000; the amount of the component (A) is 0.07 to 0.8 part by weight per 100 parts by weight of the polycarbonate resin; the phosphorus compound is a phosphorous acid ester selected from the group consisting of trisnonylphenyl phosphite and trisphenyl phosphite; and the amount of the component (B) is no more than 0.0008 part by weight per 100 parts by weight of the polycarbonate resin.

13. The composition as claimed in claim 1, wherein the polycarbonate resin is of the formula

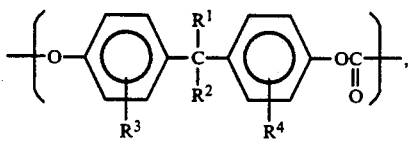

wherein $R^1$, $R^2$, $R^3$ and $R^4$, independently of each other are, a hydrogen atom, a hydrocarbon group or a halogen atom.

14. The composition as claimed in claim 13, wherein the alcohol is selected from the group consisting of hexacosanol-1, octacosanol-1, nacosanol and melissyl.

* * * * *